United States Patent
Gong (10) Patent No.: US 11,399,092 B2
(45) Date of Patent: Jul. 26, 2022

(54) METHOD FOR PREVENTING SIP DEVICE FROM BEING ATTACKED, CALLING DEVICE, AND CALLED DEVICE

(71) Applicant: YEALINK (XIAMEN) NETWORK TECHNOLOGY CO., LTD., Xiamen (CN)

(72) Inventor: Weiping Gong, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/307,806

(22) Filed: May 4, 2021

(65) Prior Publication Data
US 2021/0352174 A1 Nov. 11, 2021

(30) Foreign Application Priority Data
May 8, 2020 (CN) .......................... 202010379911.5

(51) Int. Cl.
H04M 3/38 (2006.01)
H04M 3/22 (2006.01)
H04M 3/42 (2006.01)

(52) U.S. Cl.
CPC ......... H04M 3/382 (2013.01); H04M 3/2272 (2013.01); H04M 3/2281 (2013.01); H04M 3/42059 (2013.01)

(58) Field of Classification Search
CPC .. H04M 3/382; H04M 3/2272; H04M 3/2281; H04M 3/42059
USPC .................................................... 379/142.05
See application file for complete search history.

(56) References Cited

U.S. PATENT DOCUMENTS

| 6,105,133 A | * | 8/2000 | Fielder | H04L 9/3228 |
| | | | | 713/169 |
| 8,601,146 B2 | * | 12/2013 | Pascual Avila | H04L 63/08 |
| | | | | 455/411 |
| 9,473,529 B2 | * | 10/2016 | Ormazabal | H04L 63/1458 |
| 2011/0099282 A1 | * | 4/2011 | Pascual Avila | H04L 63/08 |
| | | | | 709/227 |
| 2011/0255446 A1 | * | 10/2011 | Potts | H04L 65/1096 |
| | | | | 370/259 |
| 2012/0174217 A1 | * | 7/2012 | Ormazabal | H04L 63/1458 |
| | | | | 726/22 |

(Continued)

FOREIGN PATENT DOCUMENTS

CN 101729871 A 6/2010

*Primary Examiner* — Binh Kien Tieu (57) ABSTRACT

The present disclosure discloses a method for preventing a SIP device from being attacked, a calling device, and a called device, belonging to the field of network security. The present disclosure provides a method including: generating, by a calling device and a called device, the same public password, and transmitting, by the calling device, a connection request to the called device; performing, by the called device, header field verification on the connection request to verify whether a specified header field is carried in the connection request; performing, by the called device, device verification on the connection request; and performing, by the called device, identity verification on the connection request, and establishing, by the called device, a connection to the calling device. In this case, spoofing data is filtered out and the SIP device is not easily attacked, so that a user is free of disturbance.

12 Claims, 5 Drawing Sheets

(56) References Cited

U.S. PATENT DOCUMENTS

| | | | |
|---|---|---|---|
| 2014/0298037 A1* | 10/2014 | Xiao | H04L 63/0869 |
| | | | 713/181 |
| 2020/0053136 A1* | 2/2020 | Filart | H04L 65/1096 |
| 2020/0336314 A1* | 10/2020 | Barakat | H04L 9/3247 |
| 2021/0258428 A1* | 8/2021 | Fouquet | H04L 65/1069 |
| 2022/0094548 A1* | 3/2022 | Asveren | H04L 65/1069 |

* cited by examiner

METHOD FOR PREVENTING SIP DEVICE FROM BEING ATTACKED, CALLING DEVICE, AND CALLED DEVICE

CROSS REFERENCE TO RELATED APPLICATIONS

The present application claims the benefit of Chinese Patent Application No. 202010379911.5 filed on May 8, 2020, the contents of which are hereby incorporated by reference.

BACKGROUND

Technical Field

The present disclosure relates to the field of network security, and more specifically, to a method for preventing a SIP device from being attacked, a calling device, and a called device.

Related Art

The Session Initiation Protocol (SIP) is a signaling control protocol at an application layer, and is used for creating, modifying, and releasing sessions of one or more participants. The sessions may be Internet multimedia conferences, IP telephony, or multimedia distribution. The participants of the sessions can communicate through multicast, unicast, or a mixture of the two.

As the computer science and technology progress, an IP data network based on the packet switching technology, with convenience and low costs, has replaced the traditional telephone network based on circuit switching as the core in the field of communications. As the signaling control protocol at the application layer, the SIP provides complete session creation and session modification services for a variety of instant messaging services. Therefore, the security of the SIP is vital to the security of instant messaging.

With the rapid development of the network and the gradual improvement in hacking technology, because SIP transmission is in text form, more and more SIP devices built on a public network are under the risk of being attacked. Hackers can use a port scanning tool to determine a port currently monitored by a public network device, and send intercepted spoofing data to the corresponding port to attack a SIP device, to cause the SIP device to break down from normal use.

Chinese Patent Application No. CN200910260082.2, published on Jun. 9, 2010, discloses a method for secure cross-domain access to a SIP video monitoring system. In the method, an INVITE method defined in the RFC3261 is extended to complete cross-domain route exploration, server security capacity negotiation, and inter-server bidirectional identity authentication, and securely transmit two shared keys between servers. After the route exploration is completed, based on digest calculation of the two shared keys, a user identity, and other information, the legitimacy of a subsequent cross-domain signaling source is ensured, thereby ensuring the security of user cross-domain access. However, the invention has disadvantages of being incompatible with access of a third-party device, and easy to be cracked due to an AUTH header field carried in a first authentication request.

SUMMARY

1. Technical Problems to be Resolved

Regarding the problem of malicious attacks on SIP messages when public network ports are scanned in the related art, the present disclosure provides a method for preventing a SIP device from being attacked, a calling device, and a called device. In this method, a verification process is added but no header field is increased, and only a value of the header field is modified, so that spoofing data is filtered out, and the SIP device is not easily attacked.

2. Technical Solutions

The objective of the present disclosure is achieved by using the following technical solutions.

A method for preventing a SIP device from being attacked is provided, including the following steps:

generating, by a calling device and a called device, the same public password, and transmitting, by the calling device, a connection request to the called device;

performing, by the called device, header field verification on the connection request to verify whether a specified header field is carried in the connection request, and if not, performing device verification; otherwise, performing identity verification;

performing, by the called device, device verification on the connection request, if the verification succeeds, generating, by the called device and the calling device, specified information, and re-transmitting, by the calling device, the connection request to the called device; otherwise, discarding the connection request; and performing, by the called device, identity verification on the connection request, and if the verification succeeds, establishing, by the called device, a connection to the calling device; otherwise, discarding the connection request.

Further, the performing, by the called device, device verification on the connection request includes the following steps:

calculating, by the called device, a Call_ID value of a header field in the connection request; and determining whether a calculation result is the same as a node value in the connection request, and if yes, determining that the verification succeeds; otherwise, determining that the verification fails.

Further, the generating, by the called device and the calling device, specified information includes the following steps:

generating, by the called device, a random value and an authentication request, and adding the random value to the authentication request;

transmitting, by the called device, the authentication request to the calling device;

performing, by the calling device, calculation on the random value in the authentication request and the public password to obtain an encrypted value of the header field; and adding, by the calling device, the header field with the encrypted value to the connection request.

Further, the performing, by the called device, identity verification on the connection request includes the following steps:

determining whether the random value of the header field in the connection request is correct, and if yes, proceeding to a next step; otherwise, determining that the verification fails; and performing calculation on the public password and the random value of the header field, and determining whether a calculation result is the same as the encrypted value in the header field, and if yes, determining that the verification succeeds; otherwise, determining that the verification fails.

A calling device is provided, including:

a password generation unit, configured to generate the same public password as a called device;

an information generation unit, configured to generate specified information;

a transmission unit, configured to transmit a connection request to the called device; and a communication unit, configured to establish a connection to the called device.

Further, the information generation unit of the calling device further includes:

a first calculation module, configured to perform calculation on a random value in an authentication request and the public password to obtain an encrypted value of a header field; and an information filling module, configured to add the header field with the encrypted value to the connection request.

A called device is provided, including:

a password generation unit, configured to generate the same public password as a calling device;

a receiving unit, configured to receive a connection request transmitted by the calling device;

a header field verification unit, configured to: perform header field verification on the connection request to verify whether a specified header field is carried in the connection request, where if no specified header field is carried in the connection request, the called device executes a device verification unit; otherwise, the called device executes an identity verification unit;

the device verification unit, configured to: perform device verification on the connection request, where if the verification succeeds, the called device adds specified information to the connection request and executes a communication unit; otherwise, the called device discards the connection request;

an information generation unit, configured to generate the specified information;

the identity verification unit, configured to perform identity verification on the connection request, where if the verification succeeds, the called device establishes a connection to the calling device; otherwise, the called device discards the connection request; and the communication unit, configured to establish a connection to the calling device.

Further, the device verification unit of the called device includes:

a second calculation module, configured to calculate a Call_ID value in the connection request; and a first determining module, configured to: determine whether a calculation result is the same as a node value in the connection request, and if yes, determine that the verification succeeds; otherwise, determine that the verification fails.

Further, the information generation unit of the called device includes:

an authentication request generation module, configured to: generate a random value and an authentication request, and add the random value to the authentication request; and an authentication request transmission module, configured to transmit the authentication request to the calling device.

Further, the identity verification unit of the called device includes:

a second determining module, configured to: determine whether the random value of the header field in the connection request is correct, where if the random value of the header field in the connection request is correct, the called device executes a third determining module; otherwise, determine that the verification fails; and the third determining module, configured to: perform calculation on the public password and the random value of the header field, determine whether a calculation result is the same as the encrypted value in the header field, and if yes, determine that the verification succeeds; otherwise, determine that the verification fails.

3. Beneficial Effects

Compared with the related art, the present disclosure has the following advantages:

None of existing third-party device packet spoofing attack can be intercepted without perception, and a user receives calls from an attacker. In the present disclosure, third-party devices and hacker attack packets that do not carry correct passwords are filtered out and discarded through a plurality of verifications of a connection request, so that the user is free of disturbance. In the present disclosure, by setting a TAG node value, device verification verifies whether the device that initiates a connection is a third-party device. Normally, connection of only a specified device is allowed, and access of a third-party device without a password is rejected. In the related art, a user-agent header field is usually used to determine whether a device is in accordance with the specifications. As the user-agent header field is unchanged, hackers can simulate the obtaining based on captured packet content, modify an obtained value and launch an attack. In comparison, the TAG node value changes and is not easy to be cracked. In the present disclosure, when the calling device initiates a connection request to the called device for the first time, the connection request does not carry a header field for verification, and the header field for verification is generated and carried only after a corresponding device that meets specifications is detected. This resolves the problem that a packet is easy to be cracked. A public password is used for encryption authentication and verification while random value Nonce data in the connection request is periodically deleted, which reduces the possibility of data interception attacks.

DETAILED DESCRIPTION

The present disclosure is described in detail below with reference to the accompanying drawings and specific embodiments.

Figure 1:
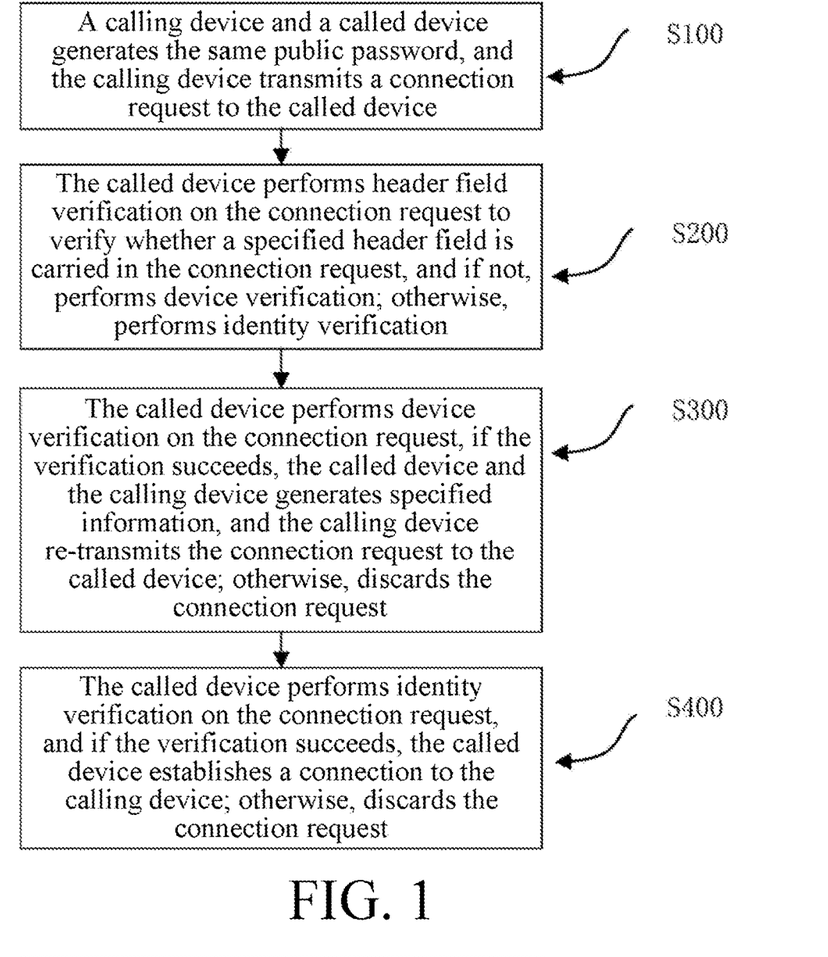
FIG. 1 is a schematic flowchart of a method for preventing a SIP device from being attacked according to an embodiment of the present disclosure.

As shown in FIG. 1, an embodiment provides a method for preventing a SIP device from being attacked, applicable to a calling device and a called device, and specifically including the following steps:

Before the calling device transmits a connection request, that is, INVITE signaling, to the called device, the calling device and the called device generate the same public password, and the public password is used for verification and determining in a process of connection establishment between the calling device and the called device.

Step S100: A calling device transmits a connection request to a called device.

Specifically, the connection request described in this embodiment is INVITE signaling in the SIP. The INVITE signaling includes an AUTH header field, a TAG node value, a Call_ID value, a CSEQ value, and the like. The Call_ID is an ID randomly generated by each device during a call. The TAG node value is calculated based on the Call_ID value. The AUTH header field is a header field generated in accordance with SIP specifications, and includes parameters such as a username (Username), a realm value (Realm), a random number (Nonce), a link address (Uri), and an encrypted value (Response). Realm is a key parameter when a key is encrypted, indicating a domain to which the current key belongs. Uri is a link address, which is similar to Realm in function. Response is a parameter value of the AUTH header field, and is a string of characters generated by a SHA encryption operation of the public password and Nonce. The SHA is a 128-bit hash algorithm. The CSEQ value is used for determining whether INVITE signaling is a new request or a re-upload of an old request.

Step S200: The called device performs header field verification on the connection request to verify whether a specified header field is carried in the connection request, and if not, performs device verification; otherwise, performs identity verification.

Specifically, in this embodiment, the specified header field is the AUTH header field. If an AUTH header field is not carried in the connection request, the device verification in step S300 is performed; otherwise, the identity verification in step S400 is performed. The header field verification is used for verifying whether an AUTH header field exists in a connection request. If the AUTH header field exists, it means that the signaling is a connection request generated and transmitted by a specified device through a device verification process, or the signaling is a connection request transmitted by a specified device and intercepted by a hacker, and device verification is not required and just identity verification is performed. The specified device is a device that has a public password preset at the factory or that subsequently obtains a public password. If the AUTH header field does not exist, it means that the signaling may be a first connection request transmitted by a specified device or other devices, and the device verification is required. This method verifies the connection request three times, and the header field verification is the first verification. According to specifications of this method, the first connection request transmitted by a calling device that meets the specifications does not carry a header field for verification, and the header field for verification is generated and carried only after a corresponding device that meets the specifications is detected, which resolves the problem that a packet is easy to be cracked.

Step S300: The called device performs device verification on the connection request, if the verification succeeds, the called device and the calling device generates specified information, and the calling device re-transmits the connection request to the called device; otherwise, discards the connection request.

Figure 2:
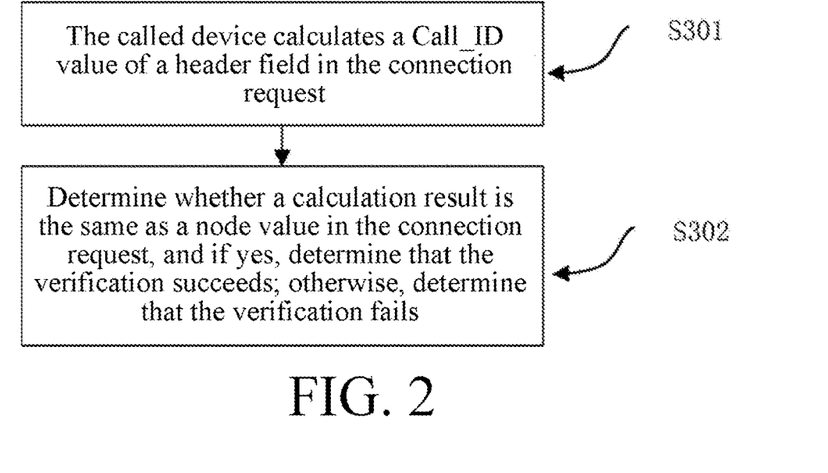
FIG. 2 is a schematic flowchart of header field verification according to an embodiment of the present disclosure.

Specifically, the device verification is used for verifying whether a device is a specified device. If the verification succeeds, it means that the device is a specified device; and if the verification fails, it means that the device is not a specified device. The specified information in this embodiment is a random value Nonce and an authentication request. After the calling device re-transmits the connection request to the called device, the called device receives the connection request and re-performs the header field verification. As shown in FIG. 2, the device verification specifically includes the following steps:

Step S301: The called device calculates a Call_ID value of a header field in the connection request. In this embodiment, the calculation performed by the called device on the Call_ID value of the header field in the connection request is a SHA encryption operation.

Step S302: Determine whether a calculation result is the same as a node value in the connection request, and if yes, determine that the connection request passes the verification; otherwise, determine that the connection request does not pass the verification. A node value is set to verify whether the device that initiates a connection request is a specified device, and if yes, the connection is allowed to perform and a header field is generated. The node value in this embodiment is a TAG node in the SIP. In the prior art, a user-agent header field is usually used to determine whether a device is in accordance with the specifications. As the user-agent header field is unchanged, hackers can simulate the obtaining based on captured packet content, modify an obtained value and launch an attack. In comparison, the TAG node is a random number and changes constantly, not easy to be cracked, which improves the security of the connection.

Figure 3:
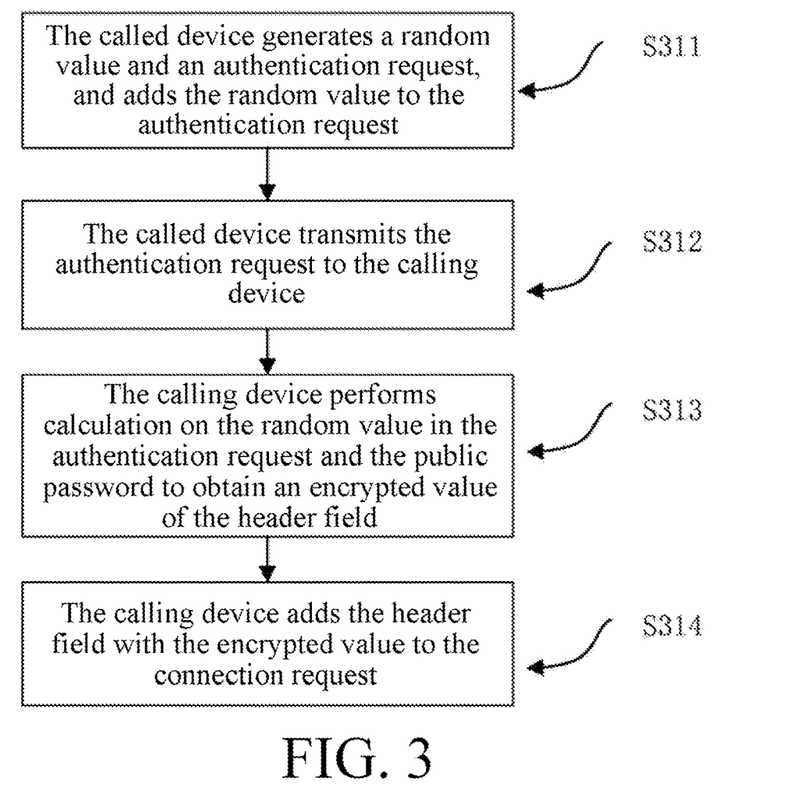
FIG. 3 is a schematic flowchart of device verification according to an embodiment of the present disclosure.

As shown in FIG. 3, after the device verification succeeds, the generating, by the called device and the calling device, specified information includes the following steps:

Step S311: The called device generates a random value and an authentication request, and adds the random value to the authentication request.

Specifically, in this embodiment, the authentication request is a 401 authentication request commonly used in the SIP, and the random value is Nonce. The called device stores the random value in the called device after the random value is generated, and the called device deletes the random value recorded by the called device after a few seconds, which is preferably set to 5 seconds in this embodiment. Since the signaling is transmitted in plaintext, deleting the random value in a short time prevents a hacker from intercepting the signaling for simulated transmission.

Step S312: The called device transmits the authentication request to the calling device.

Step S313: After receiving the authentication request, the calling device performs a SHA operation on the random value Nonce in the authentication request and the public password to obtain an encrypted value of the header field. In this embodiment, the public password is a public password stored locally by the calling device, the header field is an AUTH header field, and the encrypted value is Response. The SHA operation is performed on the public password and the random value Nonce to obtain the encrypted value Response. Since the public password is only owned by the calling device and the called device, the encrypted value Response can only be generated and identified by the calling device and the called device. The random value Nonce is randomly generated. Even if a hacker can intercept the encrypted value Response, Response of each connection are different. Thus, Response in an abnormally generated connection request cannot establish a connection.

Step S314: The calling device adds the header field to the connection request, where the Call_ID value of the header field in the connection request remains unchanged, and the TAG node value is randomly generated, increases the value of CSEQ by 1, and transmits the connection request to the called device.

Step S400: The called device performs identity verification on the connection request, and if the verification succeeds, the called device establishes a connection to the calling device; otherwise, discards the connection request. If the connection request is discarded without processing, the calling device cannot detect that the connection is not established until timeout, which can avoid frequent call attacks from the calling device. The identity verification is used for verifying the authenticity of a connection request, and determining whether the connection request is signaling transmitted by a calling device or pseudo signaling that is illegally obtained and re-transmitted.

Figure 4:
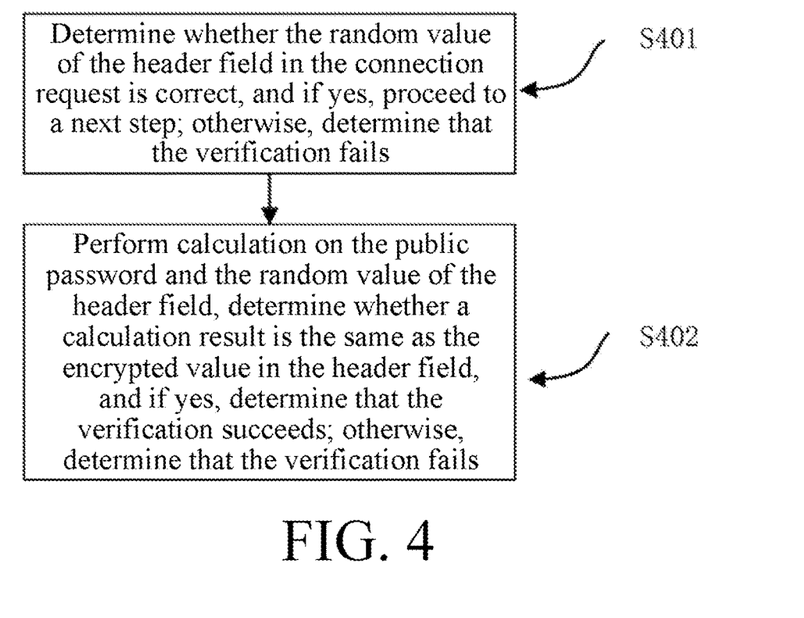
FIG. 4 is a schematic flowchart of identity verification according to an embodiment of the present disclosure.

As shown in FIG. 4, the performing, by the called device, identity verification on the connection request includes the following steps:

Step S401: Determine whether the random value of the header field in the connection request is correct, that is, determine whether the random value Nonce is the same as a value previously recorded locally by the called device, and if yes, proceed to a next step; otherwise, determine that the verification fails.

Specifically, by verifying whether the random value Nonce is the same as the value recorded locally, it is determined whether the random value Nonce in the connection request is a random value generated by the called device after the device verification succeeds. In addition, since the random value is deleted in a short time, it is difficult to crack the random value in a short time even if a hacker has means to crack the random value. After the random value is cracked and added to the connection request, the random value stored in the called device has been deleted, and the two cannot be matched, which reduces the risk of data interception attacks.

Step S402: The called device performs a SHA operation on the random value in the header field and the stored public password to determine whether a calculation result is the same as the encrypted value Response in the header field, and if yes, determines that the verification succeeds; otherwise, determines that the verification fails.

Specifically, by verifying whether the random value of the encrypted value Response of the header field in the connection request is correct, it is determined whether the connection request is a connection request generated through the foregoing device verification and header field verification processes. As the last verification process of this method, this process is combined with the previous two processes. If the connection request does not pass any one of the device verification or the header field verification, the connection request cannot pass this identity verification, which improves the security of the present disclosure.

Figure 5:
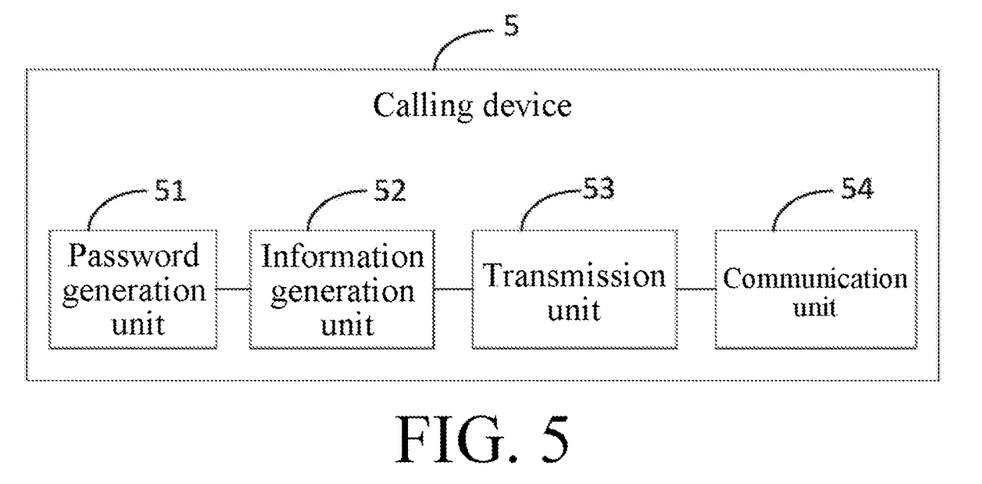
FIG. 5 is a structural block diagram of a calling device according to an embodiment of the present disclosure.

FIG. 5 shows a calling device 5, including: a password generation unit 51, configured to generate the same public password as a called device; an information generation unit 52, configured to generate specified information; a transmission unit 53, configured to transmit a connection request to the called device; and a communication unit 54, configured to establish a connection to the called device.

Figure 6:
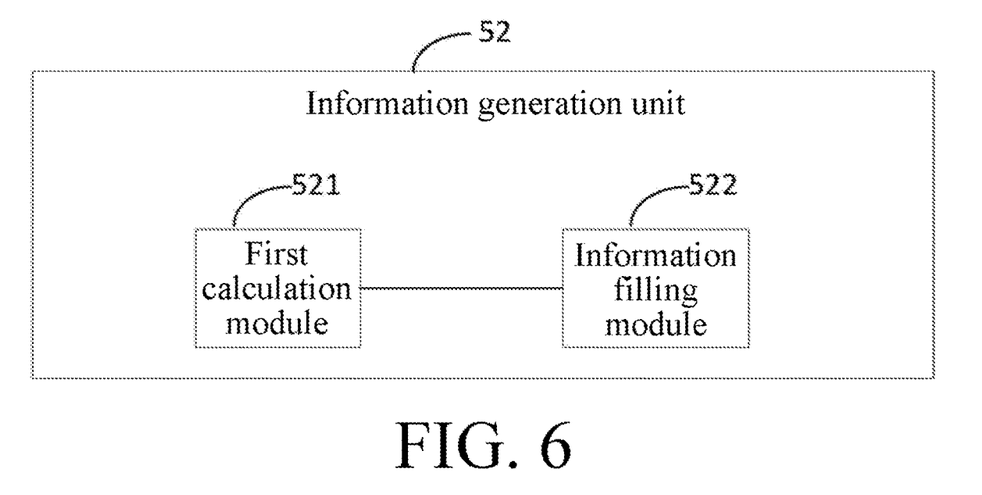
FIG. 6 is a structural block diagram of an information generation unit of the calling device according to an embodiment of the present disclosure.

As shown in FIG. 6, the information generation unit 52 of the calling device 5 further includes: a first calculation module 521, configured to perform calculation on a random value in an authentication request and the public password to obtain an encrypted value of a header field; and an information filling module 522, configured to add the header field with the encrypted value to the connection request.

Figure 7:
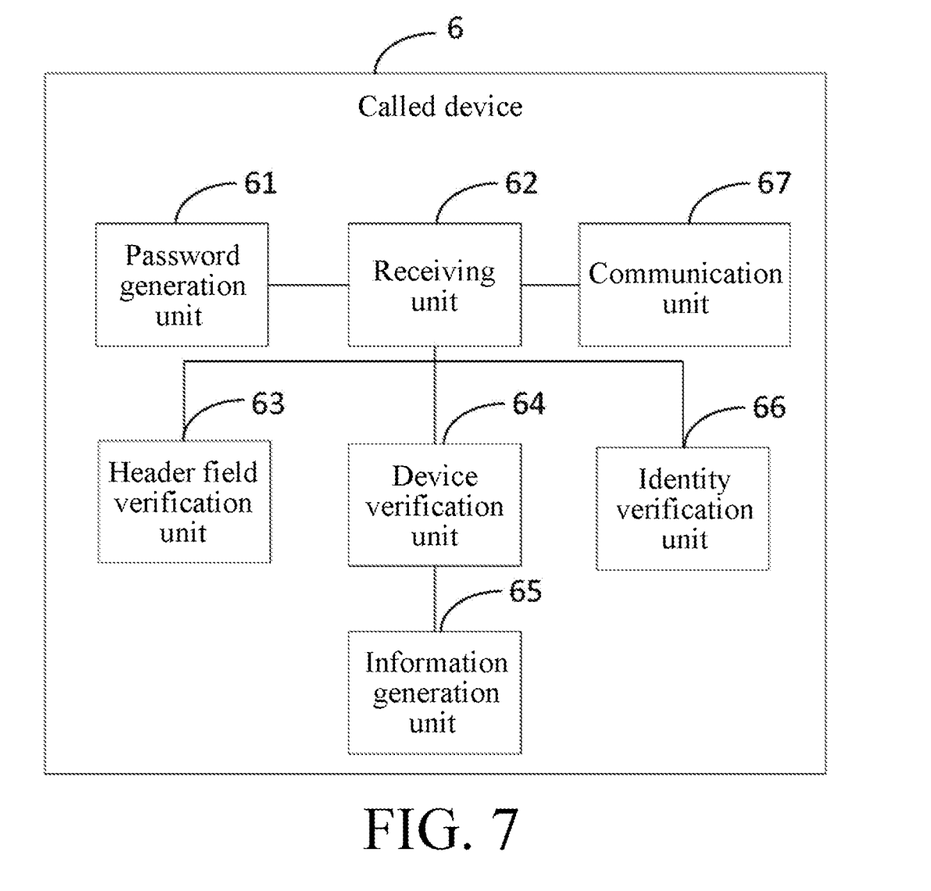
FIG. 7 is a structural block diagram of a called device according to an embodiment of the present disclosure.

FIG. 7 shows a called device 6, including: a password generation unit 61, configured to generate the same public password as a calling device; a receiving unit 62, configured to receive a connection request transmitted by the calling device; a header field verification unit 63, configured to: perform header field verification on the connection request to verify whether a specified header field is carried in the connection request, where if no specified header field is carried in the connection request, the called device executes a device verification unit 64; otherwise, the called device executes an identity verification unit 66; the device verification unit 64, configured to: perform device verification on the connection request, where if the verification succeeds, the called device adds specified information to the connection request and executes a communication unit 67; otherwise, the called device discards the connection request; an information generation unit 65, configured to generate the specified information of the called device; the identity verification unit 66, configured to perform, by the called device, identity verification on the connection request, where if the verification succeeds, the called device establishes a connection to the calling device; otherwise, the called device discards the connection request; and the communication unit 67, configured to establish a connection to the calling device.

Figure 8:
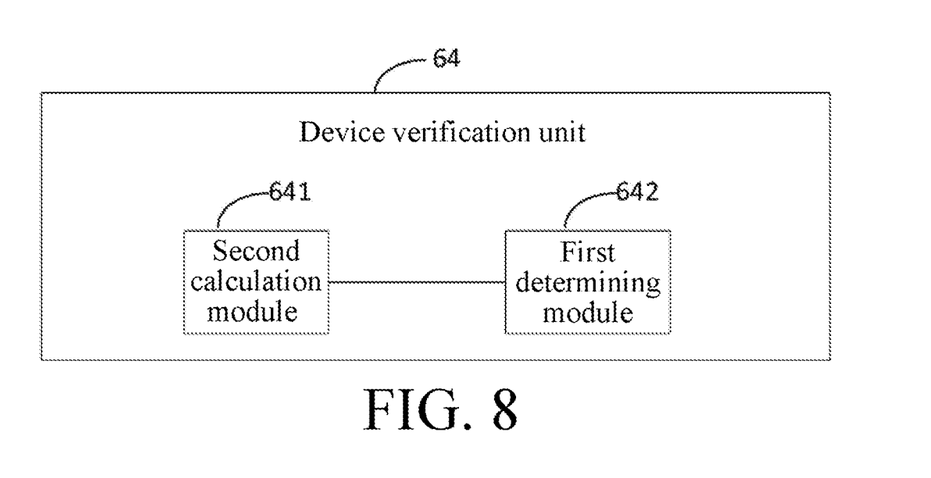
FIG. 8 is a structural block diagram of a device verification unit of the called device according to an embodiment of the present disclosure.

As shown in FIG. 8, the device verification unit 64 of the called device includes: a second calculation module 641, configured to calculate a Call_ID value in the connection request; and a first determining module 642, configured to: determine whether a calculation result is the same as a node value in the connection request, and if yes, determine that the verification succeeds; otherwise, determine that the verification fails.

Figure 9:
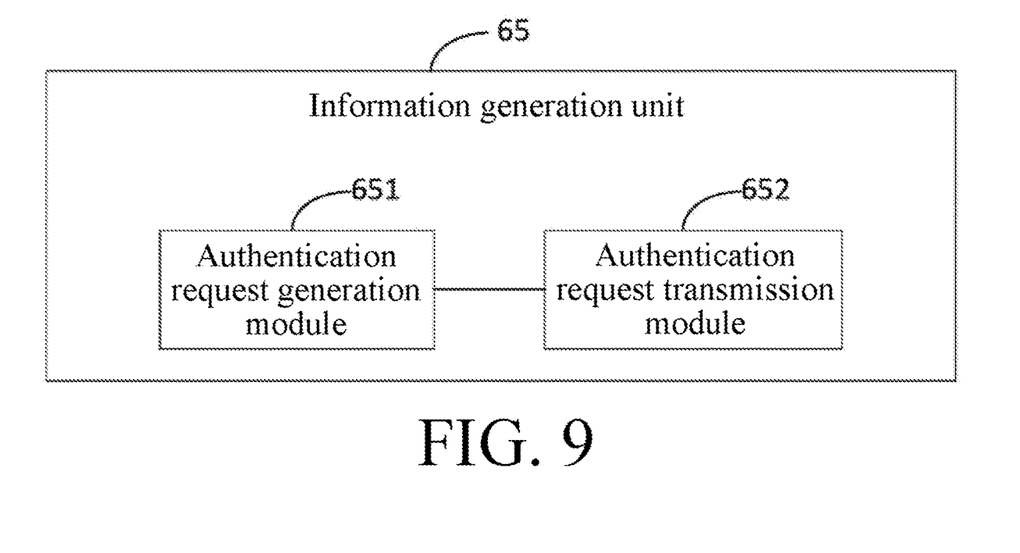
FIG. 9 is a structural block diagram of an information generation unit of the called device according to an embodiment of the present disclosure.

As shown in FIG. 9, the information generation unit 65 of the called device includes: an authentication request generation module 651, configured to: generate a random value and an authentication request, and add the random value to the authentication request; and an authentication request transmission module 652, configured to transmit the authentication request to the calling device.

Figure 10:
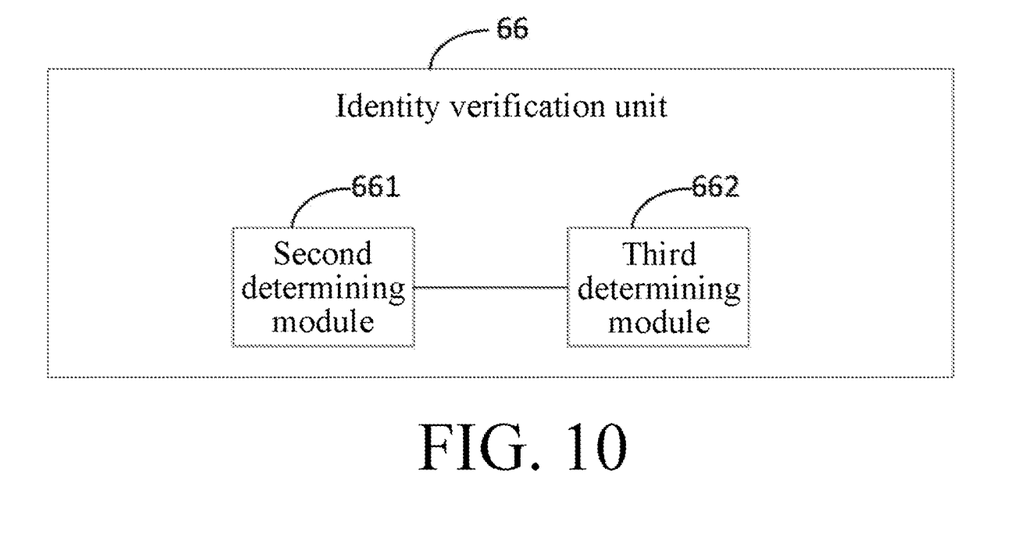
FIG. 10 is a structural block diagram of an identity verification unit of the called device according to an embodiment of the present disclosure.

As shown in FIG. 10, the identity verification unit 66 of the called device includes: a second determining module 661, configured to: determine whether the random value of the header field in the connection request is correct, where if the random value of the header field in the connection request is correct, the called device executes a third determining module 662; otherwise, determine that the verification fails; and the third determining module 662, configured to: perform calculation on the public password and the random value of the header field, determine whether a calculation result is the same as the encrypted value in the header field, and if yes, determine that the verification succeeds; otherwise, determine that the verification fails.

The modules of the embodiments of the present disclosure may be implemented by a universal integrated circuit, for example, a central processing unit (CPU) or an application-specific integrated circuit (ASIC).

The following embodiment is a process of normally establishing a connection between a calling device and a called device:

The calling device in a system first transmits INVITE signaling to the called device. When the calling device transmits the INVITE signaling for the first time, the signaling includes a TAG node value but does not carry an AUTH header field. The TAG node value is calculated based on a Call_ID header field value of the calling device by using a SHA algorithm. The SHA is a 128-bit hash algorithm. After receiving the INVITE signaling, the called device verifies whether the INVITE signaling carries an AUTH header field. After verifying that the INVITE signaling does not carry an AUTH header field, the called device verifies whether the TAG node and the Call_ID header field value in the signaling satisfy a SHA relationship. As a first filter, TAG is used for determining whether a device is a specified device. After the signaling passes the first filter, header field verification is required. Therefore, INVITE signaling that does not carry AUTH but carries a TAG node satisfying a SHA relationship is signaling transmitted by a specified device. This is the first verification.

The INVITE signaling of the calling device passes the first verification. The called device replies to the calling device with a 401 authentication request, and randomly generates a Nonce value. The Nonce value is recorded locally, and the recorded value is deleted in 5 s. The called device returns the authentication request carrying the Nonce value to the calling device.

After receiving the 401 authentication request from the called device, the calling device performs SHA calculation on the public password and the Nonce in the 401 authentication request, and obtains an AUTH header field as an authentication value. The AUTH header field includes Username, Realm, a random number Nonce, Uri, and Response. Response is a string of characters generated by a SHA operation of the public password and Nonce. The calling device adds the calculated AUTH header field to the INVITE signaling. The Call_ID header field remains unchanged, the TAG node generates a random value, and a value of CSEQ is increased by 1. The INVITE signaling is re-transmitted to the called device.

The called device receives the INVITE signaling from the calling device, verifies that the INVITE signaling carries the AUTH header field, and then performs a SHA verification operation. The called device first determines whether the Nonce in the AUTH header field in the INVITE signaling of the calling device is the recorded value, and performs a SHA operation on the public password and the Nonce. Then an operation result is compared with the Response value in the AUTH header field. At this time, the Response is the same as the operation result, the verification succeeds, and the called device establishes a connection to the calling device.

The following embodiment is a process of establishing a connection between a third-party calling device and a system called device:

The third-party calling device first transmits INVITE signaling to the called device. The calling device does not carry an AUTH header field when the calling device transmits the INVITE signaling for the first time. After receiving the INVITE signaling, the called device verifies whether the INVITE signaling carries an AUTH header field.

After verifying that the INVITE signaling does not carry an AUTH header field, the called device verifies whether a TAG node and a Call_ID header field value in the signaling satisfy a SHA relationship. After the signaling passes the first filter, 401 header field verification is required. Therefore, INVITE signaling that does not carry AUTH and carries a TAG node not satisfying a SHA relationship is signaling transmitted by a third-party device. The called device discards the signaling without processing.

The following embodiment is a process of establishing a connection to a called device after a hacker intercepts INVITE signaling:

After the hacker intercepts INVITE signaling that the last call is normal, the calling device transmits the intercepted INVITE signaling to the called device. After receiving the INVITE signaling, the called device verifies whether the signaling carries an AUTH header field.

If the called device verifies that the signaling carries an AUTH header field, the called device performs identity verification on the signaling, where a SHA operation is performed on a random value in the header field and a stored public password. Because a Nonce value of each call is different, and Nonce of the called device is discarded in a short time or after the call ends, an obtained SHA operation result is different from an encrypted value Response in the header field. In this case, it is determined that the identity verification fails, the called device discards the signaling without processing, the call is not established normally, and the user does not perceive the hacker's attack.

The foregoing has schematically described the invention and its implementation, but the description is not restrictive. The present disclosure can be implemented in other specific forms without departing from the spirit or the basic feature of the present disclosure. The content shown in the accompanying drawings is merely one of the implementations of the present disclosure, and the actual structure is not limited thereto. Any reference signs in the claims should not be construed as limiting the claims. Therefore, under the teaching of the present disclosure, any structures and embodiments similar to the technical solution that are made by those skilled in the art without creative efforts and without departing from the spirit of the present disclosure shall all fall within the protection scope of the present disclosure. In addition, the word "include" does not exclude other elements or steps, and the word "a/an" before the element is not excluded from including "a plurality of" the elements. A plurality of elements described in the product claims may also be implemented by an element by software or hardware. The words such as "first" and "second" are only used to denote names, and do not denote any particular order.

What is claimed is:

1. A method for preventing a SIP device from being attacked, comprising the following steps:
    generating, by a calling device and a called device, the same public password, and transmitting, by the calling device, a connection request to the called device;
    performing, by the called device, header field verification on the connection request to verify whether a specified header field is carried in the connection request, and under the condition where the specified header field is not carried in the connection request, performing device verification; otherwise, performing identity verification;

performing, by the called device, device verification on the connection request, under the condition where the verification succeeds, generating, by the called device and the calling device, specified information, and re-transmitting, by the calling device, the connection request to the called device; otherwise, discarding the connection request; and performing, by the called device, identity verification on the connection request, and under the condition where the verification succeeds, establishing, by the called device, a connection to the calling device; otherwise, discarding the connection request.

2. The method for preventing a SIP device from being attacked according to claim 1, wherein the performing, by the called device, device verification on the connection request comprises the following steps:

calculating, by the called device, a Call ID value of a header field in the connection request; and determining whether a calculation result is the same as a node value in the connection request, and under the condition where the calculation result is the same as the node value in the connection request, determining that the verification succeeds; otherwise, determining that the verification fails.

3. The method for preventing a SIP device from being attacked according to claim 2, wherein the generating, by the called device and the calling device, specified information comprises the following steps:

generating, by the called device, a random value and an authentication request, and adding the random value to the authentication request;

transmitting, by the called device, the authentication request to the calling device;

performing, by the calling device, calculation on the random value in the authentication request and the public password to obtain an encrypted value of the header field; and adding, by the calling device, the header field with the encrypted value to the connection request.

4. The method for preventing a SIP device from being attacked according to claim 1, wherein the performing, by the called device, identity verification on the connection request comprises the following steps:

determining whether the random value of the header field in the connection request is correct, and under the condition where the random value of the header field in the connection request is correct, proceeding to a next step; otherwise, determining that the verification fails; and performing calculation on the public password and the random value of the header field, and determining whether a calculation result is the same as the encrypted value in the header field, and under the condition where the calculation result is the same as the encrypted value in the header field, determining that the verification succeeds; otherwise, determining that the verification fails.

5. The method for preventing a SIP device from being attacked according to claim 2, wherein the performing, by the called device, identity verification on the connection request comprises the following steps:

determining whether the random value of the header field in the connection request is correct, and under the condition where the random value of the header field in the connection request is correct, proceeding to a next step; otherwise, determining that the verification fails; and performing calculation on the public password and the random value of the header field, and determining whether a calculation result is the same as the encrypted value in the header field, and under the condition where the calculation result is the same as the encrypted value in the header field, determining that the verification succeeds; otherwise, determining that the verification fails.

6. The method for preventing a SIP device from being attacked according to claim 3, wherein the performing, by the called device, identity verification on the connection request comprises the following steps:

determining whether the random value of the header field in the connection request is correct, and under the condition where the random value of the header field in the connection request is correct, proceeding to a next step; otherwise, determining that the verification fails; and performing calculation on the public password and the random value of the header field, and determining whether a calculation result is the same as the encrypted value in the header field, and under the condition where the calculation result is the same as the encrypted value in the header field, determining that the verification succeeds; otherwise, determining that the verification fails.

7. A calling device, comprising:

a password generation unit, configured to generate the same public password as a called device;

an information generation unit, configured to generate specified information;

a transmission unit, configured to transmit a connection request to the called device; and a communication unit, configured to establish a connection to the called device, wherein, before the calling device connects to the called device, the called device performs header field verification on the connection request to verify whether a specified header field is carried in the connection request, and under the condition where the specified header field is not carried in the connection request, the called device performs device verification, and otherwise, performs identity verification;

the called device performs the device verification on the connection request, and under the condition where the device verification succeeds, the calling device generates the specified information, adds the specified information to the connection request, and re-transmits the connection request to the called device, and otherwise, the calling device discards the connection request; and the called device performs the identity verification on the connection request, and under the condition where the identity verification succeeds, the called device establishes a connection to the calling device, and otherwise, discards the connection request.

8. The calling device according to claim 7, wherein the information generation unit comprises:

a first calculation module, configured to perform calculation on a random value in an authentication request and the public password to obtain an encrypted value of a header field; and an information filling module, configured to add the header field with the encrypted value to the connection request, the header field corresponding to the specified information.

9. A called device, comprising:
a password generation unit, configured to generate the same public password as a calling device;
a receiving unit, configured to receive a connection request transmitted by the calling device;
a header field verification unit, configured to: perform header field verification on the connection request to verify whether a specified header field is carried in the connection request, wherein under the condition where no specified header field is carried in the connection request, executes a device verification unit; otherwise, executes an identity verification unit;
the device verification unit, configured to: perform device verification on the connection request, wherein under the condition where the verification succeeds, adds specified information to the connection request and executes a communication unit; otherwise, discards the connection request;
an information generation unit, configured to generate the specified information;
the identity verification unit, configured to perform identity verification on the connection request, wherein under the condition where the verification succeeds, the called device establishes a connection to the calling device; otherwise, the called device discards the connection request; and
the communication unit, configured to establish a connection to the calling device.

10. The called device according to claim 9, wherein the device verification unit comprises:
a second calculation module, configured to calculate a Call ID value in the connection request; and
a first determining module, configured to: determine whether a calculation result is the same as a node value in the connection request, and under the condition where the calculation result is the same as the encrypted value in the header field, determine that the verification succeeds; otherwise, determine that the verification fails.

11. The called device according to claim 9, wherein the information generation unit comprises:
an authentication request generation module, configured to: generate a random value and an authentication request, and add the random value to the authentication request; and
an authentication request transmission module, configured to transmit the authentication request to the calling device.

12. The called device according to claim 9, wherein the identity verification unit comprises:
a second determining module, configured to: determine whether the random value of the header field in the connection request is correct, wherein under the condition where the random value of the header field in the connection request is correct, executes a third determining module; otherwise, determine that the verification fails; and
the third determining module, configured to: perform calculation on the public password and the random value of the header field, determine whether a calculation result is the same as an encrypted value in the header field, and under the condition where the calculation result is the same as the encrypted value in the header field, determine that the verification succeeds; otherwise, determine that the verification fails.

* * * * *